(12) United States Patent
Tsirkin et al.

(10) Patent No.: US 8,626,824 B2
(45) Date of Patent: *Jan. 7, 2014

(54) PERSISTING GRAPHICS STRUCTURES ACROSS RESOLUTION CHANGE IN GRAPHICS REMOTING ENVIRONMENT

(75) Inventors: Michael S. Tsirkin, Yokneam (IL); Izik Eidus, Kfar Saba (IL)

(73) Assignee: Red Hat Israel, Ltd., Raanana (IL)

( * ) Notice: Subject to any disclaimer, the term of this patent is extended or adjusted under 35 U.S.C. 154(b) by 977 days.

This patent is subject to a terminal disclaimer.

(21) Appl. No.: 12/714,376

(22) Filed: Feb. 26, 2010

(65) Prior Publication Data

US 2011/0210972 A1    Sep. 1, 2011

(51) Int. Cl.
*G06F 15/16* (2006.01)
(52) U.S. Cl.
USPC ............ 709/203; 709/217; 709/224; 345/428
(58) Field of Classification Search
USPC ................... 709/203, 214, 224; 345/428, 643
See application file for complete search history.

(56) References Cited

U.S. PATENT DOCUMENTS

| | | | |
|---|---|---|---|
| 7,359,920 B1 | | 4/2008 | Rybicki et al. |
| 8,230,008 B2* | | 7/2012 | Tsirkin et al. ................ 709/203 |
| 2003/0023735 A1* | | 1/2003 | Funahashi et al. ............ 709/229 |
| 2006/0271500 A1* | | 11/2006 | Obrea et al. .................... 705/76 |
| 2007/0183493 A1* | | 8/2007 | Kimpe ....................... 375/240.1 |
| 2008/0222273 A1* | | 9/2008 | Lakshmanan et al. ........ 709/219 |
| 2009/0036190 A1* | | 2/2009 | Brosnan et al. ................ 463/16 |
| 2010/0211983 A1* | | 8/2010 | Chou ............................... 725/93 |
| 2010/0211987 A1* | | 8/2010 | Chou ............................. 725/119 |
| 2010/0312548 A1* | | 12/2010 | Herley .............................. 704/9 |
| 2011/0084965 A1* | | 4/2011 | Gould et al. .................. 345/426 |

OTHER PUBLICATIONS

"Solid Ice: Provisioning Manager," Qumranet, Apr. 2008, 5 pages.
"Solid Ice: Virtual Desktop Server (VDS)," Qumranet, Apr. 2008, 6 pages.
"Solid Ice: Connection Broker," Qumranet, Apr. 2008, 7 pages.
"Solid Ice: Overview," Qumranet, Apr. 2008, 15 pages.
"KVM—Kernel-based Virtualization Machine," Qumranet, white paper, 2006, 5 pages.
Red Hat Israel Office Action for U.S. Appl. No. 12/714,380, mailed Oct. 13, 2011.
Red Hat Israel Notice of Allowance for U.S. Appl. No. 12/714,380, mailed Mar. 21, 2013.

* cited by examiner

*Primary Examiner* — Said Broome
*Assistant Examiner* — Peter Hoang
(74) *Attorney, Agent, or Firm* — Lowenstein Sandler LLP

(57) ABSTRACT

A local system receives a graphics structure generated from an application hosted within the local system, where the application is accessed by a remote system. The graphics structure represents a display output from the application, where the graphics structure is generated in response to a change of display characteristics of the local system. A hash generator generates a first hash from the graphics structure according to a hash algorithm. It is determining whether there is an existing hash maintained by the local system that matches the first hash. The local system transmits the first hash to the remote system without sending the graphics structure if there is an existing hash matching the first hash. The first hash is used by the remote system to identify a graphics structure maintained by the remote system for rendering a display of the remote system.

20 Claims, 9 Drawing Sheets

PERSISTING GRAPHICS STRUCTURES ACROSS RESOLUTION CHANGE IN GRAPHICS REMOTING ENVIRONMENT

TECHNICAL FIELD

The present invention relates generally to graphics remoting. More particularly, this invention relates to persisting graphics structures across resolution changes in graphics remoting applications.

BACKGROUND

Graphics remoting systems allow computing device network clients to connect to a remote server (also referred to as a hosting server or host) and receive a visual representation of at least some of the graphics being displayed at or output by the server. Often the network client can display all the graphical output associated with the session. Likewise, the client may be allowed to interact with the session, injecting user input, generated from devices such as a mouse or keyboard connected to the client, into the server session.

Graphical applications, such as video games, can request displaying complex graphics structures, such as textures and surfaces, on screen. How these graphics structures are displayed by a graphical user interface (GUI) system (also referred to as a window system such as X Window System™) depends on the display resolution. When an application desires to change the display resolution, it sends a command to the window system.

When the display resolution changes, typically the graphics structures have to be redrawn differently. Sometimes, an application may also desire to use different graphics structures. Currently, when the display resolution changes, the window system notifies a graphics driver regarding the change of display resolution. The window system discards all graphics structures (e.g., textures) and notifies the applications of the display resolution changed. The applications have to send all graphics structures which are then re-rendered by the graphics driver. This works relatively well for the local window system.

However, in a graphics remoting configuration, when the display resolution changes, an amount of data exchanged between a local system and a remote system will be relatively large since all graphics structures have to be resent from a hosting server to a client.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, graphics structures are maintained by a client system and/or a host system. In addition, for each graphics structure, a hash is generated from the graphics structure and maintained by both the client system and the host system. When a display resolution is changed at the host system, a new graphics structure is generated according to the new display resolution and a new hash is generated from the new graphics structure. The host system then compares the new hash with the ones maintained locally to determine whether there is an existing hash that matches the new hash. If there is an existing hash that matches the new hash, the new hash is transmitted from the host system to the client system without sending the entire graphics structure. When the client system receives the hash, the client system identifies a graphics structure stored locally based on the hash and renders the graphics structure in a display of the client. Thus, instead of resending the entire graphics structure, if the host system determines that the client system already had the same graphics structure based on the comparison of the hashes, the hash is sent to the client. The entire new graphics structure is sent to the client only if it is determined that the client does not have the new graphics structure (e.g., there is no existing hash matching the new one). As a result, the traffic across the network between the host system and the client system can be reduced significantly.

According to an alternatively embodiment, when a client requests changing the display resolution of the host, the client transmits all hashes to the host, the hashes representing all graphics structures stored locally at the client. When the host generates a new hash based on the new graphics structure in view of the new display resolution, the host can compare the new hash with the hashes received from the client to determine whether the new graphics structure needs to be sent to the client over the network. In this situation, the host does not have to maintain all the graphics structures and hashes for the particular client locally.

Figure 1:
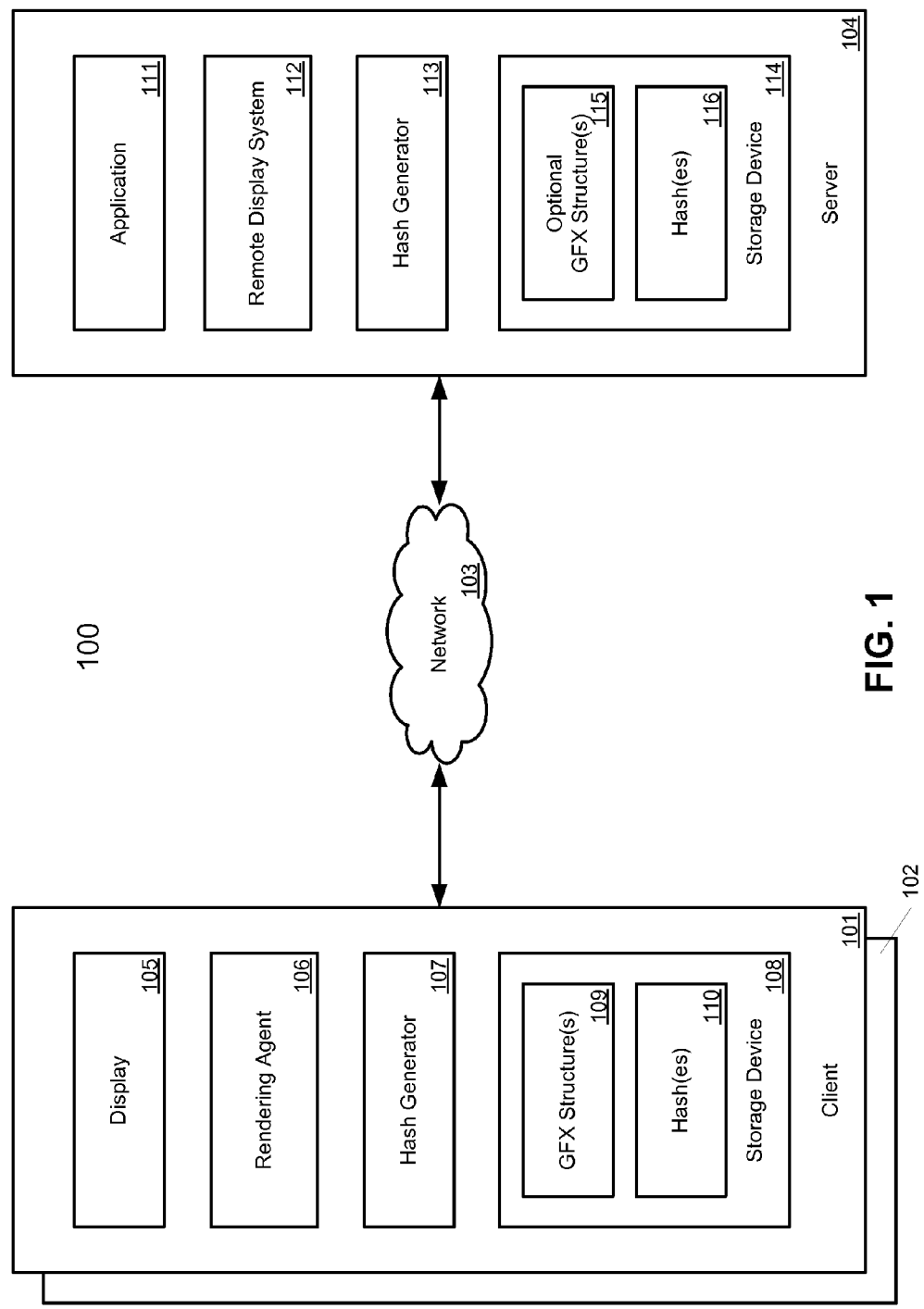
FIG. 1 is a block diagram illustrating a network configuration according to one embodiment.

FIG. 1 is a block diagram illustrating a network configuration according to one embodiment. Referring to FIG. 1, system 100 includes, but is not limited to, one or more clients 101-102 communicatively coupled to a remote server or a cluster of servers 104 over a network 103. Network 103 may be a local area network (LAN) or a wide area network (WAN) and may be a combination of one or more networks. Clients 101-102 can be any computer system in communication with server 104 for remote execution of applications at server 104. For example, system 100 may be implemented as part of a graphics remoting system. Generally, a client such as client 101 can be a computer system in communication with server 104 for remote execution of applications at server 104. Thus, input data (e.g., mouse and keyboard input) representing application commands is received at a client (e.g., client 101) and transferred over network 103 to server 104. Server 104 can be any computing system.

In response to client side data, an application (e.g., application 111) can generate output display commands (e.g., graphics commands referred to herein as graphics data or structures), which may include one or more paint and/or draw operations, for example, in the form of executable instructions. The output display commands can then be transmitted (e.g., as graphics update commands) with or without compression by a remote display system (e.g., remote display system 112) to the remote client (e.g. client 101) and a remote display application (e.g., rendering agent 106) of the remote client can collect the graphics commands and generate corresponding drawing commands for rendering data at the display (e.g., display 105) of the client.

The data may be exchanged between client 101 and server 104 using a variety of communication protocols, such as, for example, remote desktop protocol (RDP) available from Microsoft® Corporation of Redmond, Wash. or alternatively, SPICE™ (simple protocol for independent computing environments) protocol available from Red Hat, Inc.

Referring back to FIG. 1, in this example, application 111 is hosted by server 104 and remotely accessed by client 101. For example, application 111 may be a virtual desktop application hosted by a virtual desktop server (VDS) and remotely accessed by client 101, similar to the Solid ICE™ (independent computing environments) virtualization solution available from Red Hat. Application 111 generates an output (e.g., an image to be displayed) in a form of graphics structures, which are transmitted to client 101 over network 103 and rendered by rendering agent 106 in a display 105 of client 101. Typically, as described above, when a display resolution changes at server 104, client 101 may discard the existing graphics structures and the new graphics structures may have to be transmitted from server 104 to client 101. These graphics structures tend to be complicated and large in size. As a result, amount traffic between client 101 and server 104 across network 103 is significant.

According to one embodiment, graphics structures used by display outputs of application 111 are optionally maintained within server 104 as graphics structures 115 stored in a storage device 114. For example, a graphics structure can be a sphere, which may be described by specifying a sphere center, radius, color, and opacity, etc. In a graphics application such as a video game, more complex graphics structures are needed to draw a video game scene such as textures (e.g., essentially a picture drawn on a surface of a shape). The graphics structures are transmitted by remote display system 112 to client 101 over network 103, where the graphics structures are rendered by rendering agent 106 in display 105.

In addition, for each graphics structure that is transmitted to client 101, hash generator 113 is configured to generate a hash from the respective graphics structure, where the hash is used as a graphics structure identifier identifying a particular graphics structure. A hash can be generated using a variety of hashing algorithms, such as, for example, SHA-1 or MD5 algorithms. The hashes for all graphics structures generated and transmitted to client 101 are stored locally as hashes 116 in storage device 114 of server 104. On the other side, whenever client 101 receives a graphics structure from server 104 to be rendered by rendering agent 106, such a graphics structure is stored locally in storage device 108 as graphics structures 109. In addition, hash generator 107 is configured to generate a hash from each graphics structure and to store in storage device 108 as hashes 110. Storage device 114 may consist of one or more types of removable storage and/or non-removable storage.

When there is a change in display characteristics of a display at server 104, a notification regarding changing of the display resolution is transmitted to client 101. For example, a display resolution may be changed at server 104 in response to a user input, either from a user of client 101 or from a user of server 104. Typically, when such a notification is received at client 101, an existing graphics structure or structures are discarded at client 101. A new graphics structure is generated within server 104 in response to the change of display resolution and the new graphics structure is transmitted to client 101 for updating the display of client 101. Often when the display resolution changes, underlying graphics structures do not change that much or do not change at all. However, in a conventional system, new graphics structures are still transmitted to client 101 from server, even though the basic information of the graphics structures has not been changed due to the change of display resolution. As a result, unnecessary traffic can be incurred over network 103.

According to one embodiment, a new hash is generated from the new graphics structure by hash generator 113. The new hash is compared with existing hashes 116 to determine whether there is an existing hash that matches the new hash. If there is an existing hash that matches the new hash, the new hash or the existing matched hash is transmitted from server 104 to client 101, without transmitting the corresponding graphics structure. When there is an existing hash that matches the new hash, it means that the corresponding graphics structure has been previously transmitted to client 101 and it is assumed that client 101 maintains all graphics structures it received from server 104. The new graphics structure is transmitted to client 101 only when there is no existing hash that matches the new hash. In this situation, at least the new hash is stored in storage device 114 as part of hashes 116 for subsequent matching.

When client 101 receives the new hash from server 104, the new hash is compared with hashes 110 stored locally in storage device 108. Based on the comparison, the corresponding graphics structure is identified from graphics structures 109 locally maintained and stored in storage device 108. The identified graphics structure is then rendered for updating display 105. As a result, the new graphics structure does not need to be retransmitted and the traffic over network 103 can be reduced for this purpose. Note that in this configuration, server 104 may not need to maintain graphics structures 115. Rather, server 104 only needs to maintain hashes 116 for the purpose of determining whether a particular graphics structure has been previously transmitted to client 101 by matching the corresponding hash with those existing hashes 116. Note that some or all of the components as shown in FIG. 1 can be implemented in software, firmware, hardware, or a combination thereof.

Figure 2:
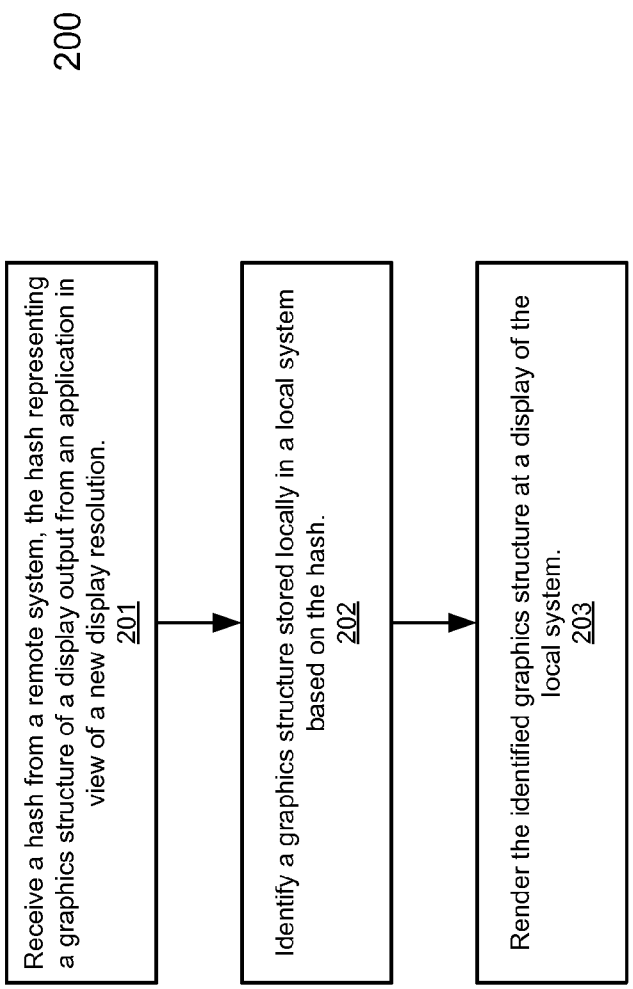
FIG. 2 is a flow diagram illustrating a method for persisting graphics structures in a graphics remoting environment according to one embodiment of the invention.

FIG. 2 is a flow diagram illustrating a method for persisting graphics structures in a graphics remoting environment according to one embodiment of the invention. Note that method 200 may be performed by processing logic which may include software, firmware, hardware, or a combination thereof. For example, method 200 may be performed by rendering agent 106 and/or hash generator 107 of FIG. 1. Referring to FIG. 2, at block 201, a hash is received from a remote system, the hash representing a graphics structure of a display output from an application hosted by the remote system in view of a new display resolution. Based on the hash, at block 202, a graphics structure is identified from a set of graphics structures locally maintained. The set of graphics structures may be those previously received from the remote system. At block 203, the identified graphics structure is rendered to update a display of a local system.

Figure 3:
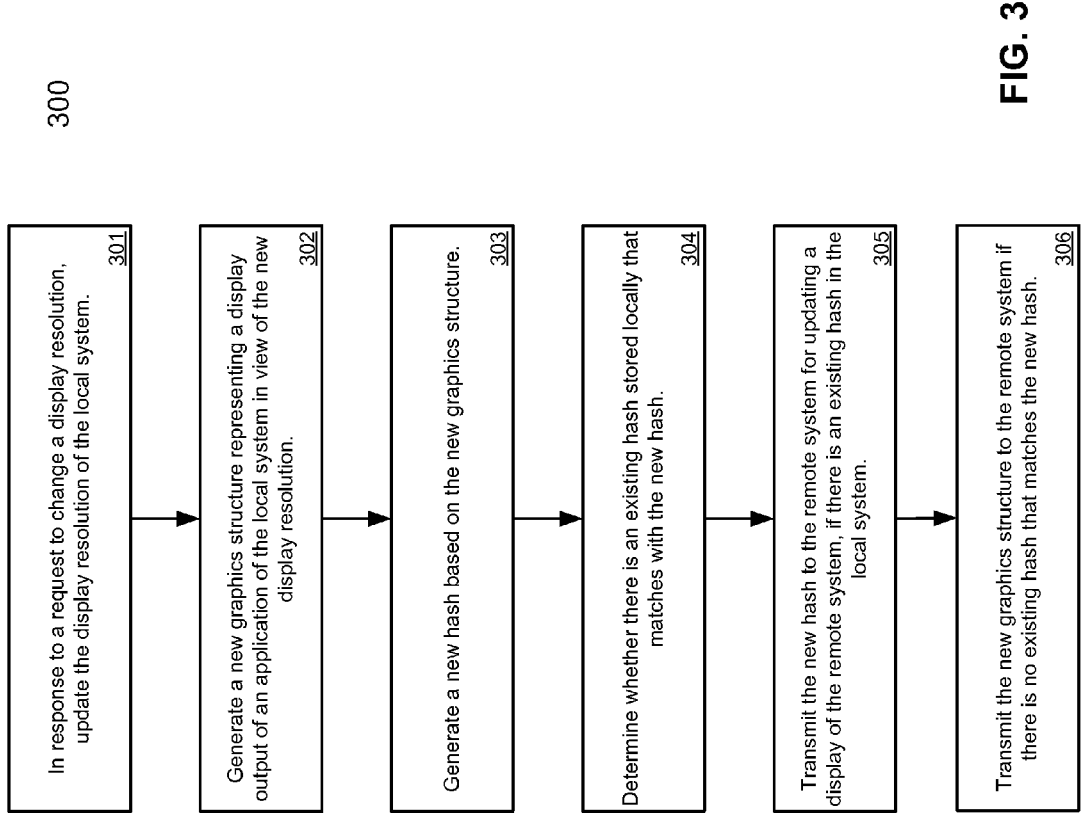
FIG. 3 is a flow diagram illustrating a method for persisting graphics structures in a graphics remoting environment according to another embodiment of the invention.

FIG. 3 is a flow diagram illustrating a method for persisting graphics structures in a graphics remoting environment according to another embodiment of the invention. Note that method 300 may be performed by processing logic which may include software, firmware, hardware, or a combination thereof. For example, method 300 may be performed by remote display system 112 and/or hash generator 113 of FIG. 1. Referring to FIG. 3, in response to a request for changing a display resolution of a local system, at block 301, the display resolution of the local system is updated in view of the new display resolution. At block 302, a new graphics structure representing a display output of an application of the local system is generated and at block 303, a new hash is generated from the new graphics structure. At block 304, processing logic determines whether there is an existing hash maintained locally that matches the new hash. If there is an existing hash matching the new hash, at block 305, the new hash is transmitted to the remote system for updating a display of the remote system without transmitting the new graphics structure. At block 306, the new graphics structure is transmitted to the remote system if there is no existing hash that matches the new hash.

Figure 4:
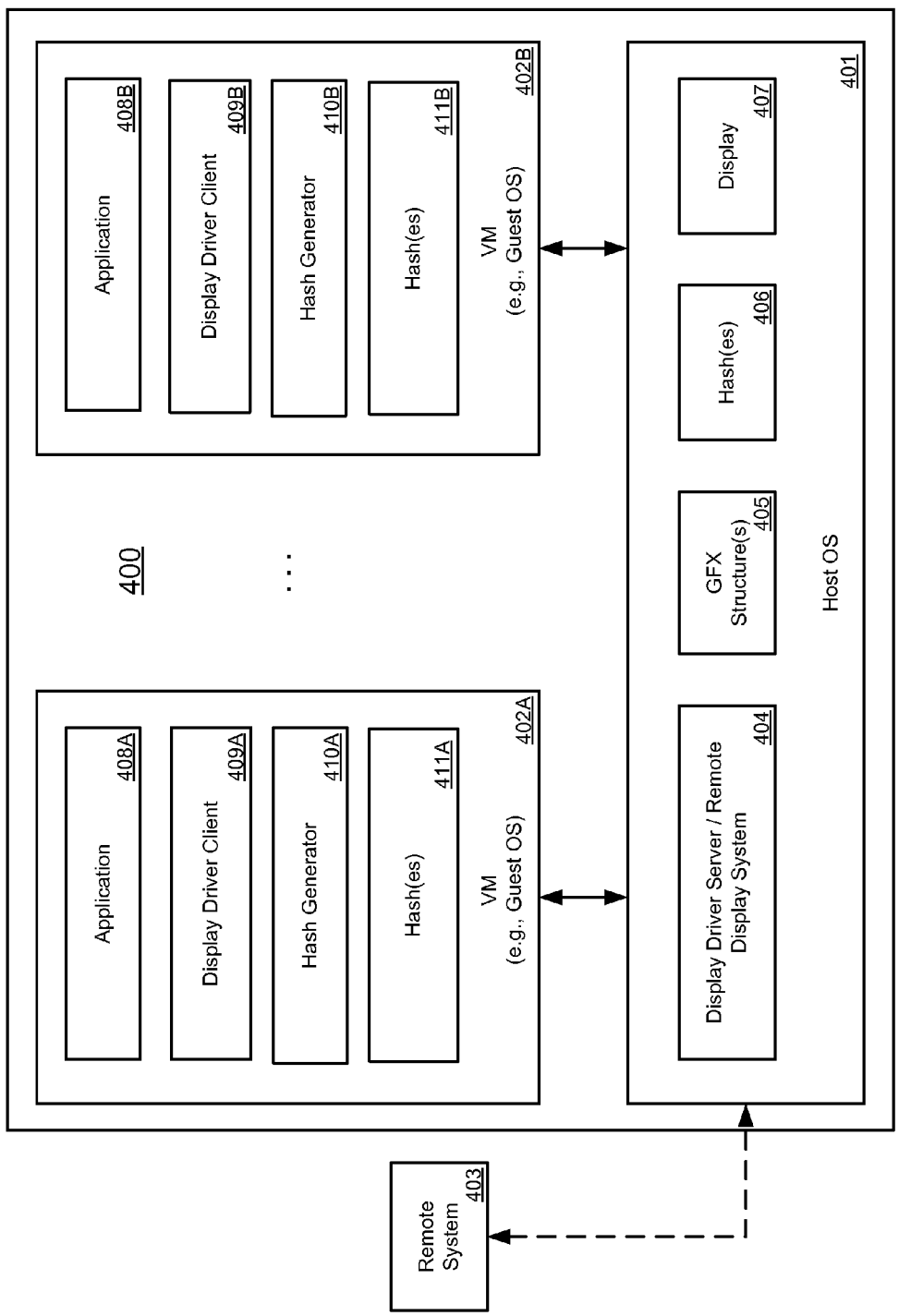
FIG. 4 is a block diagram illustrating an example of a virtualized environment which may be used with one embodiment of the invention.

According to some embodiments, the techniques described above can be applied to a virtualized operating environment. FIG. 4 is a block diagram illustrating an example of a virtualized environment which may be used with one embodiment of the invention. Referring to FIG. 4, system 400 includes one or more virtual machines 402A-402B, which can be implemented in a form of a guest OS, hosted by a host OS 401. Each of VMs 402A-402B can host an application (e.g., applications 408A-408B). Multiple guest OSes (e.g., guest OSes 402A-402B) and the associated virtual machines may be controlled by host OS 401.

Typically, a host OS represents a virtual machine monitor (VMM) (also referred to as a hypervisor) for managing the hosted virtual machines. A guest OS may be of the same or different types with respect to the host OS. For example, a guest OS may be a Windows™ operating system from Microsoft Corporation of Redmond, Wash. and a host OS may be a LINUX operating system available from Red Hat, Inc. of Raleigh, N.C. In addition, the guest OSes running on a host can be of the same or different types. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

Referring back to FIG. 4, each VM can include a display driver client (e.g., display driver clients 409A-409B) to generate graphics structures of a display output of the corresponding application, a hash generator (e.g., hash generators 410A-410B) to generate a hash (e.g., hashes 411A-411B) for each graphics structure generated by the respective display driver client and to maintain the hashes in a local storage of the guest OS.

For the purpose of illustration, when a display resolution of guest OS 402A is changed, application 408A is configured to generate a new graphics structure in view of the new display resolution, which is to be provided to host OS 401 by display driver client 409A, and hash generator 410A is configured to generate a new hash for the new graphics structure. For example, a user of host system 400 can select a window that hosts guest OS 402A, right-click on the desktop within the window, and click a button requesting resolution change. Alternatively, a specific application running within guest OS 402A can communicate with host OS 401 and request resolution change on behalf of the user. Furthermore, such a request may also be received from remote system 403 over a network as described above.

Referring back to FIG. 4, the new hash is then compared, for example, by display driver client 490A, with the existing hashes 411A to determine whether there is an existing hash that matches the new hash. If there is an existing hash that matches the new hash, display driver client 409A provides the new hash (or the corresponding existing hash) to host OS 401, which may be received by display driver server 404, where display driver server 404 may also serve as part of a remote display system as described above for a remote system 403 for remotely accessing application 408A of guest OS 402A. Note that module 404 may be shared among VMs 402A-402B or alternatively, there is a specific display driver server/remote display system module for each VM.

When module 404 receives the hash from guest OS 402A, module 404 compares the hash with hashes 406 maintained by host OS 401 to determine whether there is an existing hash that matches the hash received from guest OS 402A. If there is an existing hash that matches the hash received from guest OS 402A, the corresponding graphics structure is identified from graphics structures 405 maintained by host OS 401 based on the hash and the identified graphics structure is then rendered for updating display 407 of host OS 401. In this configuration, although guest OS 402A and host OS 401 are located within the same system, communications between a guest OS and a host OS in a virtualized operating environment are still relatively expensive in terms of processing bandwidth. However, since they are located within the same system, remote access protocols may not be needed. Rather, communications between a guest OS and a host OS for this purpose can be done via a shared memory and/or input/output (IO) commands. However, the aforementioned remote access techniques can be applied when remote system 403 accesses application 408A hosted by guest OS 402A.

Figure 5:
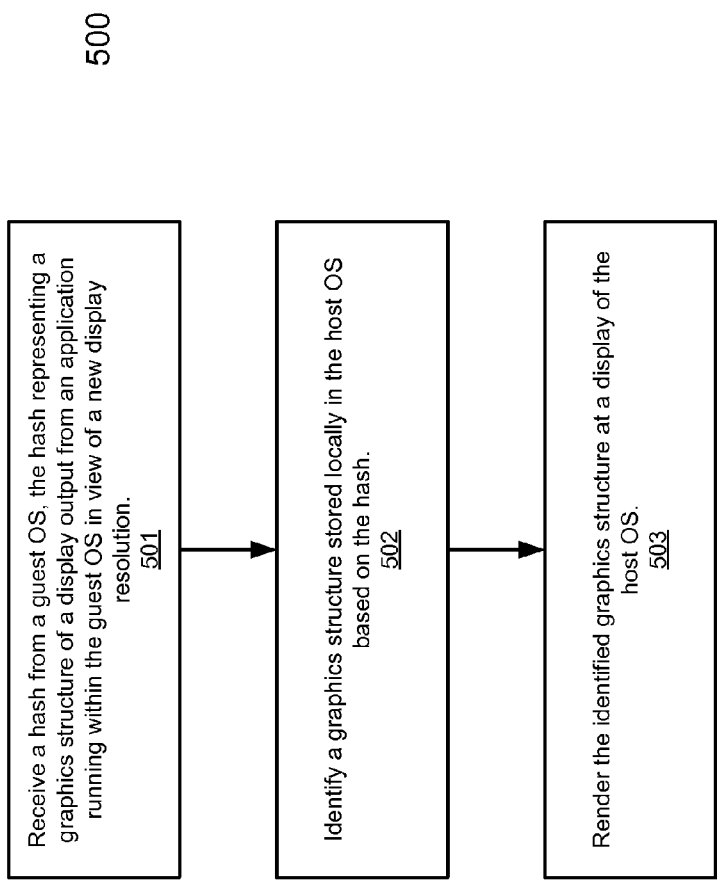
FIG. 5 is flow diagram illustrating a method for persisting graphics structures in a graphics remoting environment according to another embodiment of the invention.

FIG. 5 is a flow diagram illustrating a method for persisting graphics structures in a graphics remoting environment according to another embodiment of the invention. For example, method 500 may be performed by display driver server 404 of FIG. 4. Referring to FIG. 5, at block 501, a hash is received from a guest OS, where the hash represents a graphics structure of a display output of an application running within the guest OS in view of a new display resolution. At block 502, a graphics structure stored locally within a host OS is identified based on the hash. At block 503, the graphics structure is rendered at a display of the host OS.

Figure 6:
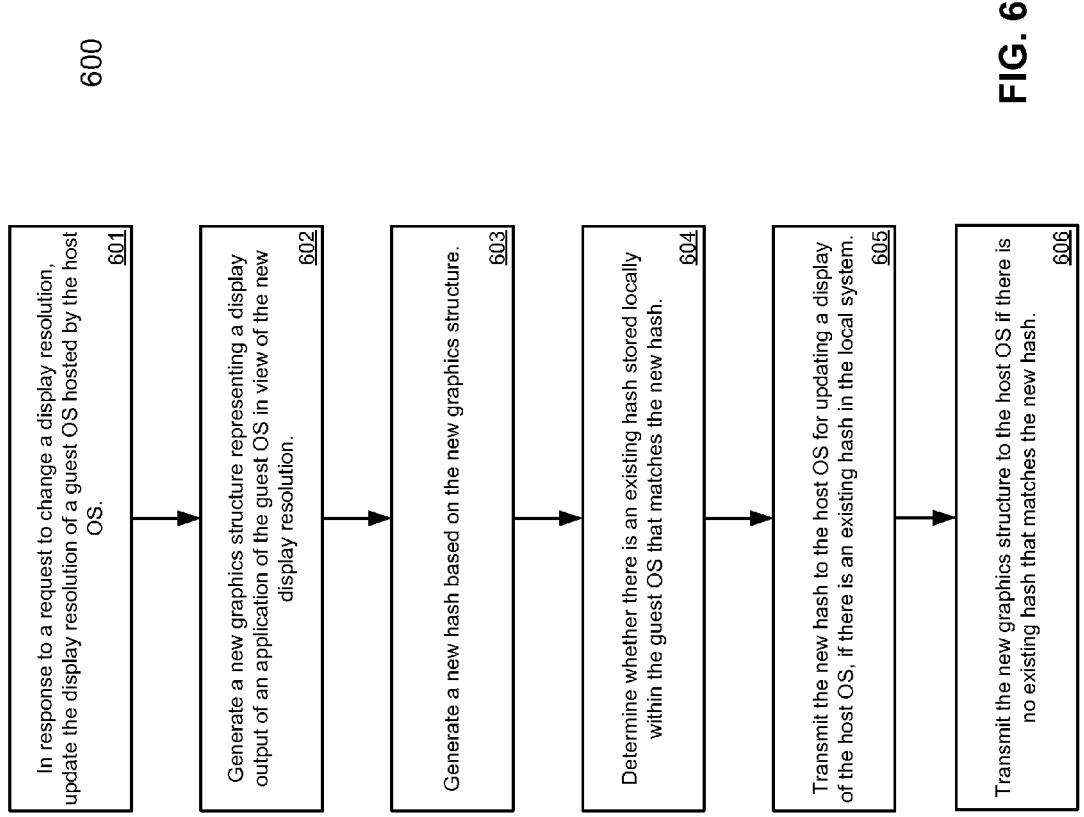
FIG. 6 is flow diagram illustrating a method for persisting graphics structures in a graphics remoting environment according to another embodiment of the invention.

FIG. 6 is flow diagram illustrating a method for persisting graphics structures in a graphics remoting environment according to another embodiment of the invention. For example, method 600 may be performed by display driver client 409A of FIG. 4. Referring to FIG. 6, at block 601, a request is received for modifying a display resolution of a guest OS and in response, the display of the guest OS is updated in view of the new display resolution. At block 602, a new graphics structure is generated which represents a display output of an application running within the guest OS in view of the new display resolution. At block 603, a new hash is generated from the new graphics structure. At block 604, it is determined whether there is an existing hash that matches the new hash. If so, at block 505, the new hash is transmitted to the host OS without transmitting the new graphics structure; otherwise at block 606, the new graphics structure is transmitted to the host OS.

According to some embodiments, instead of having a hosting node or guest OS to maintain all hashes, when a request for changing a display resolution is received, the client system is also notified of this request. In response, the client system sends all of the hashes it maintains over a time period to the hosting node or guest OS to allow the hosting node to determine whether the client system already has a particular graphics structure.

Figure 7:
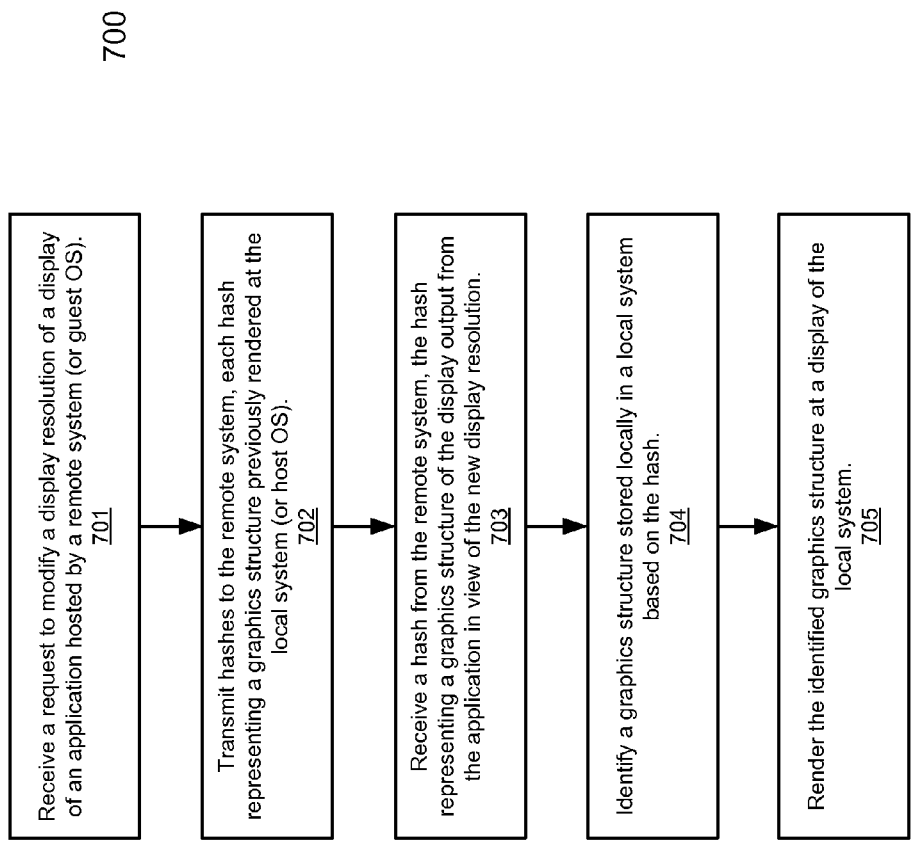
FIG. 7 is flow diagram illustrating a method for persisting graphics structures in a graphics remoting environment according to another embodiment of the invention.

FIG. 7 is a flow diagram illustrating a method for persisting graphics structures in a graphics remoting environment according to another embodiment of the invention. For example, method 700 may be performed by rendering agent 106 of FIG. 1 or display driver server 404 of FIG. 4. Referring to FIG. 7, at block 701, a request for modifying a display resolution of a remote system (or guest OS) is received. At block 702, one or more hashes representing one or more graphics structures maintained locally are transmitted to the remote system. At block 703, a hash is received from the remote system, where the hash represents a graphics structure of the display output of an application running within the remote system in view of a new display resolution. At block 704, a graphics structure is identified in view of the hash received from the remote system and at block 705, the identified graphics structure is rendered at a display of the local system.

Figure 8:
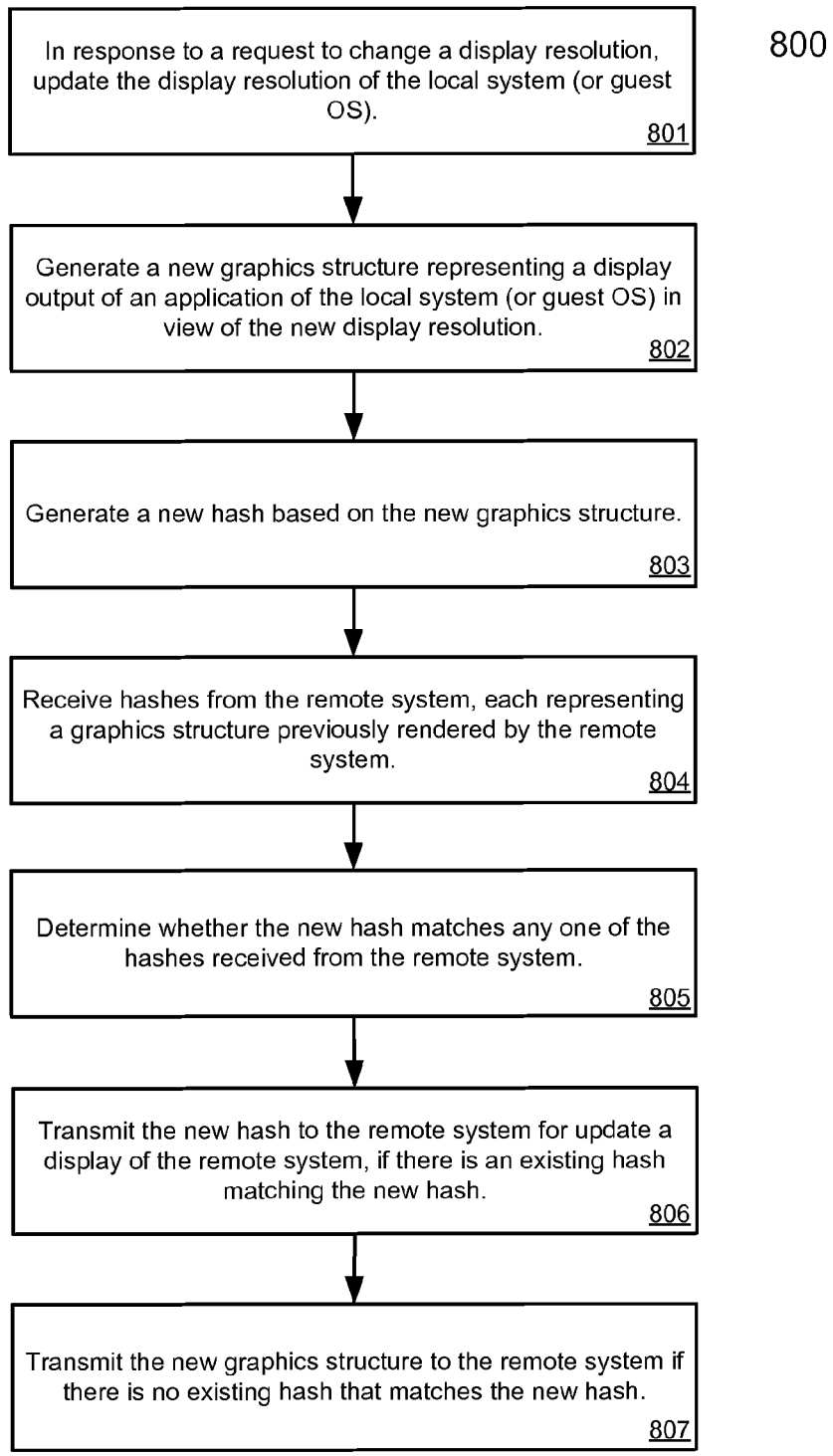
FIG. 8 is flow diagram illustrating a method for persisting graphics structures in a graphics remoting environment according to another embodiment of the invention.

FIG. 8 is a flow diagram illustrating a method for persisting graphics structures in a graphics remoting environment according to another embodiment of the invention. For example, method 800 may be performed by remote display system 112 of FIG. 1 and/or display driver server 404 of FIG. 4. Referring FIG. 8, in response to a request to change a display resolution of a local system (or guest OS), at block 801, the display resolution is updated at the local system. At block 802, a new graphics structure is generated in view of the new display resolution, where the graphics structure represents a display output of an application running within the local system. At block 803, a new hash is generated based on the new graphics structure. At block 804, one or more hashes are received from the remote system, each representing a graphics structure previously rendered and maintained by the remote system. At block 805, the new hash is compared with each of the hashes received from the remote system to determine whether the new hash matches any one of the hashes of the remote system. If there is a match, at block 806, the new hash is transmitted to the remote system without having to send the entire new graphics structure to the remote system; otherwise, at block 807, the new graphics structure is sent to the remote system only if there is no match.

Figure 9:
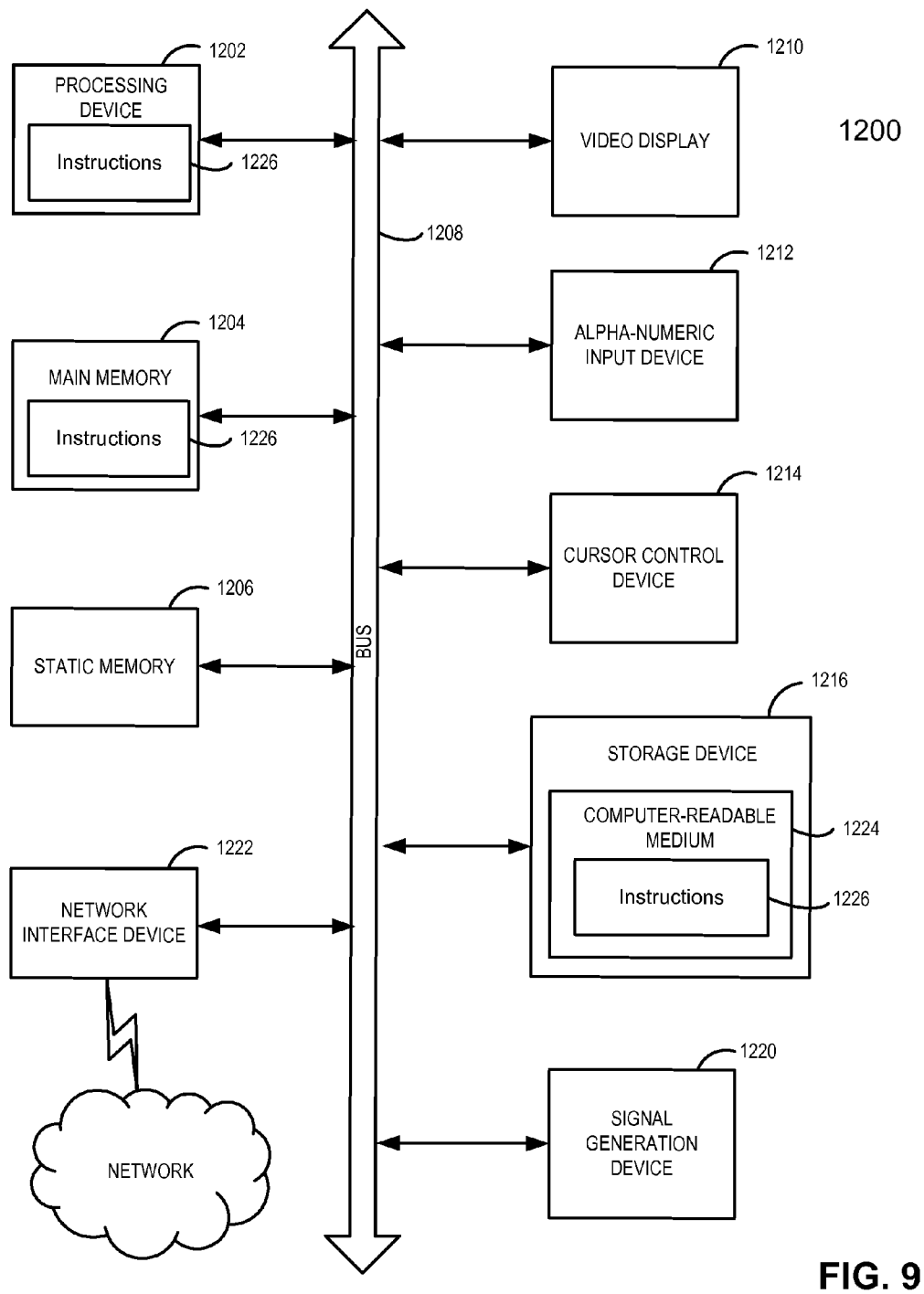
FIG. 9 is a block diagram illustrating a data processing system which may be used with an embodiment of the invention.

FIG. 9 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processor 1202, a main memory 1204 (e.g., read-only memory (ROM), flash memory, dynamic random access memory (DRAM) such as synchronous DRAM (SDRAM), etc.), a static memory 1206 (e.g., flash memory, static random access memory (SRAM), etc.), and a data storage device 1216, which communicate with each other via a bus 1208.

Processor 1202 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1202 may also be one or more special-purpose processors such as an application specific integrated circuit (ASIC), a field programmable gate array (FPGA), a digital signal processor (DSP), network processor, or the like. The processor 1202 is configured to execute the instructions 1226 for performing the operations and steps discussed herein.

The computer system 1200 may further include a network interface device 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1216 may include a computer-accessible storage medium 1224 (also known as a machine-readable storage medium or a computer-readable medium) on which is stored one or more sets of instructions or software 1226 embodying any one or more of the methodologies or functions described herein. The instructions or software 1226 may also reside, completely or at least partially, within the main memory 1204 and/or within the processor 1202 during execution thereof by the computer system 1200, the main memory 1204 and the processor 1202 also constituting machine-accessible storage media. The instructions or software 1226 may further be transmitted or received over a network via the network interface device 1222.

The computer-readable storage medium 1224 may also be used to store instructions or software 1226 persistently. While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 1228, components and other features described herein can be implemented as discrete hardware components or integrated in the functionality of hardware components such as ASICs, FPGAs, DSPs or similar devices. In addition, the modules 1228 can be implemented as firmware or functional circuitry within hardware devices. Further, the modules 1228 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A machine-implemented method for persisting graphics structures in a graphics remoting environment, the method comprising:

identifying, by a local display system of a virtual machine running on a host computer system, a graphics structure generated from an application within the virtual machine, the application accessed by a remote client computer system, the graphics structure representing a display output from the application, wherein the graphics structure is generated in response to a change of display characteristics of the local display system;

generating a first hash from the graphics structure according to a hash algorithm;

determining, by the local display system, whether there is an existing hash maintained by the local display system that matches the first hash; and transmitting, by the local display system, the first hash to a remote display system of a host operating system of the host computer system without sending the graphics structure if there is an existing hash matching the first hash, wherein the first hash is used by the remote display system to identify a graphics structure for rendering a display of the remote client computer system.

2. The method of claim 1, further comprising:

transmitting the graphics structure to the remote display system if there is no existing hash that matches the first hash; and storing the first hash in a storage device of the local display system.

3. The method of claim 1, further comprising:

maintaining a plurality of hashes within the local display system, each hash represents a graphics structure that has been transmitted to the remote display system; and comparing the first hash with at least some of the hashes to determine whether there is an existing hash that matches the first hash.

4. The method of claim 1, wherein the change of the display characteristics includes a change of display resolution of the display.

5. The method of claim 1, wherein the local display system is hosted by a guest operating system (OS) as a part of the virtual machine (VM).

6. A non-transitory computer readable medium including instructions that, when executed by a host processing system, cause the processing system to perform a method comprising:

identifying, by a local display system of a virtual machine running on a host processing system, a graphics structure generated from an application within the virtual machine, the application accessed by a remote client computer system, the graphics structure representing a display output from the application, wherein the graphics structure is generated in response to a change of display characteristics of the local display system;

generating a first hash from the graphics structure according to a hash algorithm;

determining whether there is an existing hash maintained by the local display system that matches the first hash; and transmitting the first hash to a remote display system of a host operating system of the host processing system without sending the graphics structure if there is an existing hash matching the first hash, wherein the first hash is used by the remote display system to identify a graphics structure for rendering a display of the remote client computer system.

7. The computer readable medium of claim 6, wherein the method further comprises:

transmitting the graphics structure to the remote display system if there is no existing hash that matches the first hash; and storing the first hash in a storage device of the local display system.

8. The computer readable medium of claim 6, wherein the method further comprises:

maintaining a plurality of hashes within the local display system, each hash represents a graphics structure that has been transmitted to the remote display system; and comparing the first hash with at least some of the hashes to determine whether there is an existing hash that matches the first hash.

9. The computer readable medium of claim 6, wherein the change of the display characteristics includes a change of display resolution of the display.

10. The computer readable medium of claim 6, wherein the local display system is hosted by a guest operating system (OS) as a part of the virtual machine.

11. A system, comprising:

a local display system of a virtual machine to identify a graphics structure generated from an application within the virtual machine, the application accessed by a remote client computer system, the graphics structure representing a display output from the application, wherein the graphics structure is generated in response to a change of display characteristics of the local display system; and a hash generator coupled to the local display system to generate a first hash from the graphics structure according to a hash algorithm, wherein the local display system is configured to determine whether there is an existing hash maintained locally that matches the first hash and to transmit the first hash to a remote display system of a host operating system of the host computer system without sending the graphics structure if there is an existing hash matching the first hash, wherein the first hash is used by the remote display system to identify a graphics structure for rendering a display of the remote client computer system.

12. The system of claim 11, wherein the remote display system is configured to transmit the graphics structure to the remote display system if there is no existing hash that matches the first hash and to store the first hash in a storage device.

13. A non-transitory machine-implemented method for persisting graphics structures in a graphics remoting environment, the method comprising:

receiving, by a rendering agent of a local computer system, a hash from a remote system representing a graphics structure, the graphics structure representing a display output of an application hosted by the remote system and accessed from the local system, wherein the graphics structure is generated by the remote system in response to a change of display characteristics of the remote system;

identifying, by the rendering agent, a graphics structure from a pool of one or more graphics structures maintained by the local system based on the hash, wherein the one or more graphics structures of the pool were received from the remote system previously; and rendering, by the rendering agent, the identified graphics structure on a display of the local system.

14. The method of claim 13, further comprising:

for each of the one or more graphics structures in the pool received from the remote system, generating a hash from the corresponding graphics structure; and storing hashes for the one or more graphics in a storage device of the local system.

15. The method of claim 14, wherein identifying the graphics structure based on the hash comprises:

comparing the hash received from the remote system with the hashes associated with the pool of the graphics structures; and identifying a graphics structure from the pool of graphics structures having a hash that matches the hash from the remote system.

16. The method of claim 13, wherein the local system is hosted by a host operating system (OS), and wherein the remote system is hosted by a guest OS as a part of a virtual machine (VM) hosted by the host OS.

17. A non-transitory computer readable medium including instructions that, when executed by a processing system, cause the processing system to perform a method comprising:

receiving, by a rendering agent of a local system, a hash from a remote system representing a graphics structure, the graphics structure representing a display output of an application hosted by the remote system and accessed from the local system, wherein the graphics structure is generated by the remote system in response to a change of display characteristics of the remote system;

identifying, by the rendering agent, a graphics structure from a pool of one or more graphics structures maintained by the local system based on the hash, wherein the one or more graphics structures of the pool were received from the remote system previously; and rendering, by the rendering agent, the identified graphics structure on a display of the local system.

18. The computer readable medium of claim 17, wherein the method further comprises:

for each of the one or more graphics structures in the pool received from the remote system, generating a hash from the corresponding graphics structure; and storing hashes for the one or more graphics in a storage device of the local system.

19. The computer readable medium of claim 18, wherein identifying the graphics structure based on the hash comprises:

comparing the hash received from the remote system with the hashes associated with the pool of the graphics structures; and identifying a graphics structure from the pool of graphics structures having a hash that matches the hash from the remote system.

20. The computer readable medium of claim 17, wherein the local system is hosted by a host operating system (OS), and wherein the remote system is hosted by a guest OS as a part of a virtual machine (VM) hosted by the host OS.

* * * * *